(12) United States Patent
Lautan et al.

(10) Patent No.: US 11,512,394 B2
(45) Date of Patent: Nov. 29, 2022

(54) ELECTROLESS GOLD PLATING BATH

(71) Applicant: Atotech Deutschland GmbH, Berlin (DE)

(72) Inventors: Donny Lautan, Berlin (DE); Christian Noethlich, Berlin (DE); Robert Spreemann, Berlin (DE); Boris Alexander Kraft, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 16/963,522

(22) PCT Filed: Nov. 19, 2018

(86) PCT No.: PCT/EP2018/081758
§ 371 (c)(1),
(2) Date: Jul. 21, 2020

(87) PCT Pub. No.: WO2019/145064
PCT Pub. Date: Aug. 1, 2019

(65) Prior Publication Data
US 2021/0047736 A1     Feb. 18, 2021

(30) Foreign Application Priority Data
Jan. 26, 2018   (EP) .................................. 18153739

(51) Int. Cl.
| C23C 18/44 | (2006.01) |
| C08K 3/105 | (2018.01) |
| C08K 3/16 | (2006.01) |
| C08K 3/24 | (2006.01) |
| C08K 3/30 | (2006.01) |
| C08K 3/32 | (2006.01) |

(52) U.S. Cl.
CPC .............. *C23C 18/44* (2013.01); *C08K 3/105* (2018.01); *C08K 3/16* (2013.01); *C08K 3/24* (2013.01); *C08K 3/30* (2013.01); *C08K 3/32* (2013.01)

(58) Field of Classification Search
None
See application file for complete search history.

(56) References Cited

U.S. PATENT DOCUMENTS

| 4,192,723 | A | 3/1980 | Laude et al. | |
| 5,318,621 | A | 6/1994 | Krulik et al. | |
| 6,736,886 | B2 | 5/2004 | Suda et al. | |
| 6,991,675 | B2* | 1/2006 | Suda ................ | C23C 18/48 |
| | | | | 106/1.23 |
| 9,345,145 | B2 | 5/2016 | Iwai et al. | |
| 2003/0096064 | A1* | 5/2003 | Suda .................. | C23C 18/54 |
| | | | | 427/437 |
| 2004/0009292 | A1* | 1/2004 | Kanzler ............... | C23C 18/44 |
| | | | | 427/97.3 |
| 2005/0031895 | A1 | 2/2005 | Suda et al. | |
| 2007/0175359 | A1* | 8/2007 | Hwang .............. | C23C 18/1651 |
| | | | | 106/1.23 |
| 2008/0138506 | A1 | 6/2008 | Kiso et al. | |
| 2009/0038957 | A1 | 2/2009 | Sakakibara et al. | |
| 2012/0119352 | A1* | 5/2012 | Iwai ........................ | C23C 18/44 |
| | | | | 257/734 |

FOREIGN PATENT DOCUMENTS

CN         107365985 A        11/2017

OTHER PUBLICATIONS

PCT/EP2018/081758; PCT International Search Report and Written Opinion of the International Searching Authority dated Jan. 10, 2019.
Search Report for corresponding Chinese Application No. 201880087586.6 dated Jan. 7, 2022.

* cited by examiner

*Primary Examiner* — Satya B Sastri
(74) *Attorney, Agent, or Firm* — Renner, Otto, Boisselle & Sklar, LLP

(57) ABSTRACT

The present invention concerns an electroless gold plating bath comprising
a) gold ions;
b) sulfite ions;
c) iodide ions;
d) at least one phosphonate compound according to formula (1)

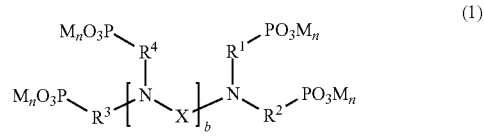

(1)

wherein
each X is independently an alkanediyl group;
$R^1$, $R^2$, $R^3$ and each $R^4$ are independently alkanediyl groups;
M is independently hydrogen, a metal atom or a cation forming radical;
each n is a rational number and selected in accordance with the valency of the respective M; and
b is an integer ranging from 1 to 10.
The invention further is directed to the use of the bath and a method for depositing a gold layer on a surface of a substrate. The bath is particularly suitable in the manufacture of printed circuit boards, IC substrates, semiconducting devices, interposers made of glass and the like.

15 Claims, No Drawings

ELECTROLESS GOLD PLATING BATH

FIELD OF THE INVENTION

The present invention concerns an electroless gold plating bath, its use and a method for depositing a gold layer on a surface of a substrate. The present invention is further directed at a kit-of-parts suitable for providing said electroless gold plating bath. The electroless gold plating bath is particularly suitable in the manufacturing of printed circuit boards, IC substrates, semiconducting devices, interposers made of glass and the like.

BACKGROUND OF THE INVENTION

Gold layers are of paramount interest in the manufacturing of electronic components and in the semiconductor industry. They are frequently used as solderable and/or wire bondable surfaces in the manufacture of printed circuit boards, IC substrates, semiconducting devices and the like. Typically, they are used as a final finish before soldering and/or wire bonding. In order to provide electrical connections of sufficient conductivity and robustness between the copper lines and wires that are bonded thereto while providing a good strength for wire bonding, there are various layer assemblies which are used conventionally in the art. Such layer assemblies typically comprise on the copper line one or more of nickel, palladium and gold.

Among others, there are electroless nickel/electroless gold (ENIG), electroless nickel/electroless palladium/immersion gold (ENEPIG), direct immersion gold (DIG), electroless palladium/immersion gold (EPIG) and electroless palladium/autocatalytic gold (EPAG).

All of these finishes require some electroless plating process. Due to the minuscule sizes of electrical components nowadays, it is not possible to use electrolytic processes which require electrical connections to the substrates. Therefore, electroless plating processes (electroless metal deposition) are used. Electroless plating generally describes methods without using external current sources for reduction of metal ions. Plating processes using external current sources are commonly described as electrolytic or galvanic plating methods. Non-metallic surfaces may be pretreated to make them receptive or catalytic for metal deposition. All or selected portions of a surface may suitably be pretreated. One type of electroless plating is autocatalytic plating. The main components of an autocatalytic metal baths are the metal salt, a reducing agent, and, as optional ingredients, a complexing agent, a pH adjuster, and additives, as for example stabilizing agents. Complexing agents (also called chelating agents in the art) are used to chelate the metal being deposited and prevent the metal from being precipitated from solution (i.e. as the hydroxide and the like). Chelating metal renders the metal available to the reducing agent that converts the metal ions to its metallic form.

A further form of metal deposition is immersion plating. Immersion plating is another deposition of metal using neither external current sources nor chemical reducing agents. The mechanism relies on the substitution of metals from an underlying substrate for metal ions present in the immersion plating solution. One disadvantage of immersion plating is that the deposition of thicker layers is normally limited by the porosity of the formed layer. Thus, once a dense layer of the metal to be deposited has formed, plating ceases.

In most cases, electroless gold plating baths use one or both types of electroless plating. Even if reducing agents have been added to the plating bath, immersion-type plating may occur albeit then in a reduced proportion. In the context of the present invention, electroless plating is to be understood as a combined deposition of autocatalytic plating with the aid of a chemical reducing agent (referred to as "reducing agent" herein) and immersion plating.

Even though these techniques have been established some time ago, there are still many challenges unresolved. Such challenges are for example the corrosion of nickel layers which are placed between gold and copper lines (also referred to as nickel corrosion in the art) and insufficient stabilities of the prior art gold plating baths which is highly undesirable due to the costs of said baths. Some prior art plating baths yield satisfactory results when freshly prepared but lose their properties quickly when being in use. This also then calls for frequent replacements of those baths.

Another aspect of importance in the manufacturing industry is the plating rate. It is highly desirable to deposit gold layers with sufficient plating rates to run manufacturing processes in an economical viable manner. It is typically required that gold plating bath have plating rates of 100 nm/h or more, preferably of 150 nm/h or more, particularly preferably of 200 nm/h or more to comply with today's industrial requirements.

Another desired property of the gold layer is the optical appearance that should be lemon yellow as a discoloration of the gold layer is not acceptable resulting in scrap production.

Although there are many electroless gold plating bath known in the prior art, many of those fail to deliver a long-term performance satisfying above-outlined technical requirements. This necessitates frequent replacements of the gold plating baths which is an economic and environmental concern.

OBJECTIVE OF THE PRESENT INVENTION

It is therefore an objective of the present invention to overcome the shortcomings of the prior art. Thus, it is an objective of the present invention to provide an electroless gold plating bath having a constant plating rate and performance for at least 5 metal turnovers (MTO), preferably for at least 10 metal turnovers.

SUMMARY OF THE INVENTION

The objectives are solved by the electroless gold plating bath according to the invention, comprising
 a) gold ions;
 b) sulfite ions;
 c) iodide ions; and
 d) at least one phosphonate compound according to formula (1)

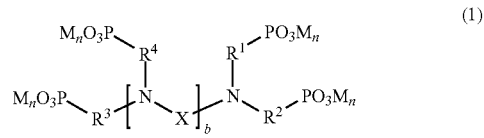

(1)

wherein
 each X is an alkanediyl group;
 $R^1$, $R^2$, $R^3$ and each $R^4$ are independently alkanediyl groups;
 M is independently hydrogen, a metal atom or a cation forming radical;

each n is a rational number and selected in accordance with the valency of the respective M; and b is an integer ranging from 1 to 10.

In case b is more than 1, X can be an independently selected alkanediyl group e.g. as a 1,2-ethanediyl group and a 1,3-propandiyl group. The occurrence and the ratio depends on the used educts to form the compound according to formula (1).

The objectives are further solved by the use of the inventive electroless gold plating bath for depositing a gold layer on a surface of a substrate.

The objectives are also solved by the inventive method for depositing a gold layer on a surface of a substrate, comprising, in this order, the method steps
(i) providing the substrate with the surface;
(ii) contacting at least a portion of the surface of the substrate with the inventive electroless gold plating bath; and
thereby depositing a gold layer onto at least one portion of the surface of the substrate, preferable the at least one portion of the substrate consists of nickel or phosphorus nickel.

Advantageously, the plating rate of the inventive electroless gold plating bath is 240 nm/h or greater.

Advantageously, the electroless gold plating bath provides solderable gold surfaces. The gold surfaces obtained from the inventive electroless gold plating bath are also suitable for wire bonding applications such as mounting of copper wires, gold wires or silver wires to the formed gold layers.

A further beneficial aspect of the present invention is that the gold layers formed from the inventive electroless gold plating bath adhere strongly to the surface of the substrate on which they have been deposited.

The electroless gold plating bath is particularly suitable for gold deposition on high-phosphorus nickel layers and mid-phosphorus nickel layers, e.g. such as those present on a copper surface such as a copper pad. High-phosphorus nickel layers (HiP—Ni) are herein understood as surfaces comprising nickel and phosphorus wherein the phosphorus content ranges from 10.0 to 15.0 wt.-% with the balance being (essentially) nickel. Mid-phosphorus nickel layers (midP—Ni) are herein understood as surfaces comprising nickel and phosphorus wherein the phosphorus content ranges from 6.0 to 9.9 wt.-% with the balance being (essentially) nickel. The nickel corrosion was at an acceptable level or even reduced compared to many prior art plating baths when using the inventive electroless gold plating bath to deposit gold on such nickel comprising surfaces.

Further advantageously, the inventive electroless gold plating bath achieves its outstanding performance without the need of toxic chemicals such as cyanide and thiourea and is thus much more environmentally friendly and safer to use than many electroless gold plating bath of the prior art.

DETAILED DESCRIPTION OF THE INVENTION

Percentages throughout this specification are weight-percentages (wt.-%) unless stated other-wise. Concentrations given in this specification refer to the volume or mass of the entire solutions/compositions unless stated otherwise. The terms "deposition" and "plating" are used interchangeably herein. Also, "layer" and "deposit" are also used synonymously in this specification. The terms "deposition composition" and "plating bath" are synonymous in the context of the present invention. The terms "substitution" and "func-tionalization" are used interchangeably in this specification. An "electrolytic metal or metal alloy deposition composition" is herein understood as a composition suitable to be used for electrolytic deposition of a metal or a metal alloy.

The term "alkyl group" according to the present invention comprises branched or unbranched alkyl groups comprising cyclic and/or non-cyclic structural elements, wherein cyclic structural elements of the alkyl groups naturally require at least three carbon atoms. C1-CX-alkyl group in this specification and in the claims refers to alkyl groups having 1 to X carbon atoms (X being an integer). C1-C8-alkyl group for example includes, among others, methyl, ethyl, n-propyl, iso-propyl, n-butyl, iso-butyl, sec-butyl, tert-butyl, n-pentyl, iso-pentyl, sec-pentyl, tert-pentyl, neo-pentyl, hexyl, heptyl and octyl. Substituted alkyl groups may theoretically be obtained by replacing at least one hydrogen by a functional group. Unless stated otherwise, alkyl groups are preferably selected from substituted or unsubstituted C1-C8-alkyl groups, more preferably from substituted or unsubstituted C1-C4-alkyl groups because of their improved solubility in water.

The term "alkanediyl group" is the corresponding derivative of an alkyl group having two bonding sites. Sometimes alkanediyl groups are referred to as alkylene groups in the art. C1-CX-alkanediyl group in this specification (X being an integer) and in the claims refers to alkanediyl groups having 1 to X carbon atoms, e.g. 1 to 12 or 2 to 4. The explanations and preferences outlined for alkyl groups apply to alkanediyl groups as well.

Unless stated otherwise, above-defined groups are substituted or unsubstituted. Functional groups as substituents are preferably selected from the group consisting of oxo (=O), hydroxyl (—OH), amino (—NH$_2$), carbonyl (—CHO) and carboxyl (—CO$_2$H) to improve the solubility of the relevant compounds in polar solvents such as water, more preferably hydroxyl. In one embodiment of the present invention, the groups are preferably unsubstituted unless stated otherwise hereinafter. Oxo is not to be mistaken for oxy (—X—) which is usually an oxygen atom of an ether moiety (and thus placed between two carbon atoms).

If more than one substituent is to be selected from a certain group, each substituent is selected independently from each other unless stated otherwise herein. The embodiments described hereinafter can be combined without restraints unless this is technically not feasible or specifically excluded. Preferred embodiments described for one aspect of the present invention are applicable mutatis mutandis to all the other aspects of the present invention unless stated otherwise herein.

A metal turnover of an electroless gold plating bath is typically understood as the complete depletion of the gold ions in the bath due to deposition and its subsequent replenishment. Thus, an electroless gold plating bath capable of plating for five metal turnovers can deposit gold in five times the amount of the initially contained gold ion concentration therein.

Preferred embodiments of the present invention which have been found to be particularly useful in fulfilling above described objectives underlying the present invention are described in the dependent claims and hereinafter.

The inventive electroless gold plating bath comprises:
a) gold ions;
b) sulfite ions;
c) iodide ions; and
d) at least one phosphonate compound according to formula (1).

It is to be understood that the listed ions (of the inventive electroless gold plating bath) refer to sources which are represented by components having these sources of the listed ions.

The inventive electroless gold plating bath comprises gold ions. Gold ions usually have oxidation states selected from the group consisting of +5, +3, +2, +1, 0, −1, −2 and −3. In the context of the present invention, preferred oxidation states are +1 and +3, more preferred is +1. Typically, gold ions in the plating bath are selected from the group consisting of $Au^+$ ions, $Au^{3+}$ ions and mixtures of the aforementioned. Preferably, $Au^+$ ions are selected for their ease of being reduced under the given conditions resulting in favorable plating rates.

Suitable sources of gold ions can be any water soluble gold salt or coordination complex suitable for liberating one of the aforementioned gold ions into the inventive electroless gold plating bath. Preferably, the source of gold ions is free of cyanide. More preferably, the source is gold ions is selected from the group consisting of trialkali gold disulfite such as tripotassium gold disulfite and trisodium gold disulfite; triammonium gold disulfite; gold thiosulfate; gold sulfate; gold chloride and gold bromide. Even more preferably, the source of gold ions is selected from the group consisting of trialkali gold disulfite; triammonium gold disulfite; gold sulfate; gold chloride and gold bromide.

The concentration of gold ions in the inventive electroless gold plating bath preferably ranges from 0.5 to 50 mmol/L, more preferably from 1 to 30 mmol/L, even more preferably from 1.5 to 10 mmol/L, yet even more preferably 3.5 to 6 mmol/L.

The inventive electroless gold plating bath comprises sulfite ions ($SO_3^{2-}$). Suitable sources of sulfite ions can be any water soluble sulfite salt or coordination complex suitable for liberating sulfite ions into the inventive electroless gold plating bath. Preferably, the source of sulfite ions is selected from the group consisting of alkali sulfite such as lithium sulfite, sodium sulfite, potassium sulfite; ammonium sulfite; and sulfurous acid. In case, one of above-mentioned sources for gold ions is used which already contains sulfite (e.g. tripotassium gold disulfite), this source may also be used (additionally to one of the aforementioned or solely) to provide sulfite ions to the inventive electroless gold plating bath. Preferably, the concentration of the sulfite ions ranges from 10 to 150 mmol/L, preferably 15 to 100 mmol/L and most preferably from 20 to 80 mmol/L.

In one embodiment of the invention, the amount of substance of the sulfite ions is at least as high as the amount of substance of the gold ions in the inventive electroless gold plating bath. Preferably, the molar ratio of gold ions to sulfite ions in the inventive electroless gold plating bath ranges from ½ to 1/30, more preferably from ⅓ to 1/20 and most preferably from ¼ to 1/16. A too low concentration of sulfite ions may lead to an unstable electroless gold plating bath and fewer metal turnover to be achieved. It was observed that in some cases a too high concentration of sulfite ions in the electroless gold plating bath lead to lower plating rates.

The inventive electroless gold plating bath comprises iodide ions. Suitable sources of iodide ions can be any water soluble iodide salt or coordination complex suitable for liberating iodide ions in the inventive electroless gold plating bath. Preferably, the source of sulfite ions is selected from the group consisting of alkali iodide such as lithium iodide, sodium iodide, potassium iodide; ammonium iodide; and hydrogen iodide. Further or alternatively, gold iodine compounds such as gold triiodide may be used as source of both gold ions and iodide ions.

Preferably, the concentration of iodide ions ranges from 4 to 100 mmol/L, more preferably from 6 to 50 mmol/L, even more preferably from 7 to 25 mmol/L. In one embodiment of the invention and in particular in cases the inventive electroless gold plating bath does not comprise any polyalkylene glycols (vide infra), the concentration of the iodide ions preferably ranges from 4 to 12.5 mmol/L, more preferably from 6 to 10 mmol/L, and even more preferably from 7 to 9 mmol/L.

The inventive electroless gold plating bath comprises at least one phosphonate compound according to formula (1).

Each M is a moiety suitable to bind to the phosphonate moiety in formula (1). Each M is independently hydrogen, a metal atom or a cation forming radical. M is not particularly restricted and the person skilled in the art can select the M with routine experiments. Each M has a valency. Such valencies are typically 1, 2, 3 or 4. Exemplarily, hydrogen has a valency of 1. Preferred metal atoms in this context are alkaline metals which also have a valency of 1 as well. Cation forming radicals can be derived from many organic amines like triethylamine. A preferred cation forming radical is ammonium and has a valency of 1 as well.

Each n is a rational number and selected in accordance with the valency of the respective M. Typically, n is 2 divided by the valency of M. Above-mentioned M are used in quantities sufficient to satisfy the valency of the phosphonate groups in the phosphonate compound according to formula (1). Since each phosphonate moiety in formula (1) has a valency of 2, if M would be sodium or hydrogen, n would be 2. If M would be a zirconium atom (valency of 4), n would be ½. The bond between the M and the respective phosphonate moiety may be ionic, polar or covalent depending on the M of choice.

$R^1$, $R^2$, $R^3$ and each $R^4$ are preferably independently C1-C6-alkanediyl groups; $R^1$, $R^2$, $R^3$ and each $R^4$ are more preferably C1-C3-alkanediyl groups; $R^1$, $R^2$, $R^3$ and each $R^4$ are even more preferably methanediyl groups. For the ease of synthesis, all of $R^1$, $R^2$, $R^3$ and each $R^4$ are preferably the same.

Integer b preferably ranges from 1 to 6, more preferably from 1 to 3 and even more preferably from 1 to 2; most preferably, b is 1.

Preferably, each X independently is a C1-C12-alkanediyl group, each X is preferably a C1-C6-alkanediyl group; each X is more preferably a C2-C4-alkanediyl group; most preferably, X is a 1,2-ethanediyl group. Preferably, all X (if there are more than one) are the same.

In one embodiment of the invention, the phosphonate compound represented by formula (1) is selected from the group consisting of

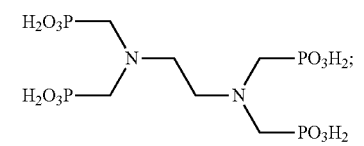

(EDTMP, CAS no. 1429-50-1)

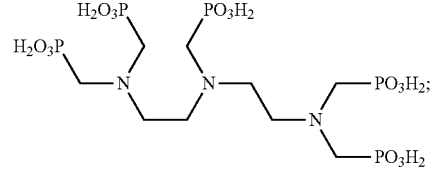

(DTPMP, CAS no. 1527-60-8)

salts and mixtures of the aforementioned.

Typical salts in this embodiment are alkali salts and ammonium salts. Preferably, the concentration of the phosphonate compound according to formula (1) ranges from 20 to 120 mmol/L, preferably from 25 to 90 mmol/L and more preferably from 30 to 60 mmol/L.

In a preferred embodiment of the invention, the inventive electroless gold plating bath comprises at least one hydroxycarboxylic acid. It was found by the inventors that the hydroxycarboxylic acid even further improves the stability of the electroless gold plating bath and allows for a greater metal turnover number to be reached compared to an inventive electroless gold plating bath without said hydroxycarboxylic acid. Preferably, the at least one hydroxycarboxylic acid is aliphatic. Suitable hydroxycarboxylic acids are inter alia aliphatic α-hydroxycarboxylic acids and β-hydroxycarboxylic acids such as citric acid, isocitric acid, gluconic acid, glyceric acid, glycolic acid, pantoic acid, lactic acid, tartaric acid, tartronic acid, threonic acid, α-hydroxyglutaric acid, β-hydroxyglutaric acid, β-hydroxybutytic acid, and malic acid.

Preferably, the at least one hydroxycarboxylic acid is a C1-C12-hydroxycarboxylic acid; more preferably a C1-C6-hydroxycarboxylic acid; even more preferably a C2-C4-hydroxycarboxylic acid. Preferably, the at least one hydroxycarboxylic acid comprises 1 to 6 hydroxyl groups; more preferably, the at least one hydroxycarboxylic acid comprises 1 to 4 hydroxyl groups; even more preferably, the at least one hydroxycarboxylic acid comprises 1 to 2 hydroxyl groups. Preferably, the hydroxycarboxylic acid comprises at least two carboxylic acid groups. In one embodiment of the invention, the hydroxycarboxylic acid is free of nitrogen. In this embodiment, the hydroxycarboxylic acid does not comprise any amino groups and imino groups.

Preferably, the concentration of the at least one hydroxycarboxylic acid ranges from 100 to 300 mmol/L, more preferably from 130 to 270 mmol/L and even more preferably from 160 to 240 mmol/L.

The pH value of the inventive electroless gold plating bath is not particularly limited. It was found to be preferable that the pH value range of the inventive bath is from 5.5 to 8.5. More preferably, the pH value ranges from 6.0 to 8.0 and most preferably from 6.5 to 7.5. Too low pH values may result in inferior stability of the electroless gold plating bath, possibly due to low stability of the sulfite ions at low pH values. Notably, high pH values are should be avoided if vulnerable substrates are to be used in the plating process such as soldermasks which are frequently used in the electronics industry.

The inventive electroless gold plating bath optionally comprises one or more acids, preferably a mineral acid such as phosphoric acid or sulfuric acid; bases such as sodium hydroxide or potassium hydroxide; and/or buffers, e.g. hydrogen phosphate/dihydrogen phosphate. These compounds can be used to adjust the pH value of the inventive electroless gold plating bath. It is advantageous and thus preferable to continuously control and adjust the pH value during usage of the inventive electroless gold plating bath as this also improves the plating bath lifetime.

It was found by the inventors of the present invention that the inventive electroless gold plating bath comprising sulfite ions, iodide ions, and the at least one phosphonate compound according to formula (1) is particularly suitable to fulfill the objectives underlying the present invention and allow for very stable electroless gold plating baths which can be used for 10 or more metal turnovers while retaining the favorable plating results over the whole lifetime of the inventive electroless gold plating bath. This synergism of the aforementioned components in the inventive electroless gold plating bath can be further enhanced by the addition of at least one hydroxycarboxylic acid.

Optionally, the inventive electroless gold plating bath comprises a polyalkylene glycol such as PEG 400 or PEG 1500. Preferable polyalkylene glycols have molecular weight average weights ranging from 100 to 3000 g/mol, preferably from 300 to 1500 g/mol. Such polyalkylene glycols are preferably used in concentrations of 0.05 to 2.5 g/L.

The inventive electroless gold plating bath optionally comprises one or more components usually used in electroless gold plating baths of the prior art such as stabilizing agents and grain refiners. These components and adequate concentrations thereof are known in the art.

Preferably, the inventive electroless gold plating bath is predominantly an immersion gold plating bath. Thus, while in use the mechanism of gold depositions relies mostly on substitution processes rather than reducing processes. Preferably, the ratio of gold deposited by an immersion process in relation to the entire gold deposition is at least 50%; more preferably at least 60% and most preferably at least 70%. If the inventive electroless gold plating bath has such higher ratios of immersion deposition, it is less prone to plate-out and can be used for a greater number of metal turnovers. In one embodiment of the invention, the ratio of gold deposited by an autocatalytic process in relation to the entire gold deposition is at least 10%; preferably at least 20%. The combined deposition process was found to be advantageous in reaching the objectives underlying the present invention such as high bath stability against plate-out and high metal turnovers while allowing for sufficient plating rates and desired properties of the formed gold layers. The ratio of gold deposited by an immersion process in relation to the entire gold deposition can be calculated based on the deposited mass of gold or depletion of gold ions in the bath and the amount of metal ions dissolved in the bath from the substrate to be plated. For example, if a nickel surface is used for plating, the amount of nickel ions in the inventive electroless gold plating bath after plating can be used for this purpose.

In one embodiment of the invention, the concentration of aldehyde-based reducing agents in the inventive electroless gold plating bath is 5 mmol/L or below, more preferably 1 mmol/L or below. Most preferably, the inventive electroless gold plating bath is (essentially) free of aldehyde-based reducing agents. Among others, aldehyde-based reducing agents are aliphatic and aromatic aldehydes such as formaldehyde; sugars having an aldehyde moiety such as glucose and mannose; benzaldehyde and precursors for any of the aforementioned such as urotropin and paraformaldehyde. This preference is due to the occasional occurrence of plate-outs and an occasionally observed reduction of achievable metal turnovers.

In one embodiment of the invention, the concentration of ascorbic acid and salts thereof in the inventive electroless gold plating bath is preferably 5 mmol/L or below, more preferably 1 mmol/L or below for the same reasons as outlined for aldehyde-based reducing agents. Most preferably, the inventive electroless gold plating bath is (essentially) free of ascorbic acid and salts thereof.

In one embodiment of the invention, the concentration of hypophosphorous acid ($H_3PO_2$) and salts thereof in the inventive electroless gold plating bath is preferably 5 mmol/L or below, more preferably 1 mmol/L or below for the same reasons as outlined for aldehyde-based reducing agents. Most preferably, the inventive electroless gold plating bath is (essentially) free of hypophosphorous acid and salts thereof.

In one embodiment of the invention, the concentration of hydroxylamine and salts thereof in the inventive electroless gold plating bath is preferably 5 mmol/L or below, more preferably 1 mmol/L or below for the same reasons as outlined for aldehyde-based reducing agents and because of the acute toxicity of these compounds. Salts of hydroxylamine are for example hydroxylamine hydrochloride and hydroxylamine sulfate. Most preferably, the inventive electroless gold plating bath is (essentially) free of hydroxylamine and salts thereof.

In one embodiment of the invention, the concentration of hydrazine and salts thereof (such as hydrazine sulfate, hydrazine hydrate, hydrazine carboxylate like hydrazine acetate, hydrazine hydrohalide like hydrazine hydrochloride) thereof in the inventive electroless gold plating bath is preferably 5 mmol/L or below, more preferably 1 mmol/L or below for the same reasons as outlined for aldehyde-based reducing agents. Moreover, these compounds are very toxic. Most preferably, the inventive electroless gold plating bath is (essentially) free of hydrazine and salts thereof.

In one embodiment of the invention, the concentration of boron-based reducing agents in the inventive electroless gold plating bath is preferably 5 mmol/L or below, more preferably 1 mmol/L or below for the same reasons as outlined for aldehyde-based reducing agents. Most preferably, the inventive electroless gold plating bath is (essentially) free of boron based reducing agents. Boron-based reducing agents are those boron containing compounds capable of reducing gold ions to metallic gold and include inter alia boranes (such as DMAB and morpholine borane), borohydrides (such as $NaBH_4$)

In one embodiment of the invention, the concentration of thiosulfate ions in the electroless gold plating bath is 10 mmol/L or below. More preferably, the concentration of thiosulfate ions is 1 mmol/L or below. Particularly preferably, the electroless gold plating bath is (essentially) free of thiosulfate ions. Thiosulfate ions may in some case be detrimental to the plating performance of the inventive electroless gold plating bath and for example can reduce the plating rate (see example X in Table 2). Further, thiosulfate in electroless gold plating bath might result in nickel corrosion and/or to poor adhesion of the gold layer on the underlying substrate.

In one embodiment of the invention, the concentration of cyanide ions in the inventive electroless gold plating bath is 1 mmol/L or less, preferably 0.1 mmol/L or less. Most preferably, the electroless gold plating bath is (essentially) free of cyanide ions for cyanide ions being highly toxic and harmful to the environment.

In one embodiment of the invention, the concentration of thiourea, N-alkylthiourea and N,N'-dialkylthiourea in the inventive electroless gold plating bath is 10 mmol/L or less, preferably 1 mmol/L or less. Most preferably, the electroless gold plating bath is free of thiourea, N-alkylthiourea and N,N'-dialkylthiourea for them being harmful to human and environment.

In one embodiment of the invention, the concentration of aminopolycarboxylic acids is 10 mmol/L or less, preferably 1 mmol/L or less. Aminopolycarboxylic acids comprise at least one amino group and at least two carboxylic acid groups. Examples of aminopolycarboxylic acids are ethylenediaminetetraacetate (EDTA), nitrilotriacetic acid (NTA), iminodiacetic acid (IDA) and pentetic acid. Most preferably, the electroless gold plating bath is free of aminopolycarboxylic acids. Aminopolycarboxylic acids in some cases might result in inferior plating results. Further, aminopolycarboxylic acids such as NTA and EDTA require extra waste-water treatment and are environmentally harmful.

Surprisingly, it was found by the inventors that commonly used plating rate enhancers such as amino acids (like alanine, glycine, glutamine, lysine, valine) did not increase the plating rate of the electroless gold plating bath (cf. example V in table 2 and U.S. Pat. No. 5,318,621). Thus, it is preferable that the concentration of amino acids in the inventive electroless gold plating bath is 2 g/L or below, more preferably of 0.5 g/L or below. Most preferably, the inventive electroless gold plating bath is (essentially) free of amino acids.

The inventive electroless gold plating bath is preferably an aqueous solution. The term "aqueous solution" means that the prevailing liquid medium, which is the solvent in the solution, is water. Further liquids, that are miscible with water, as for example alcohols and other polar organic liquids, that are miscible with water, may be added. Generally, an aqueous solution comprises more than 50 percent water by weight. It is preferred that 99 wt.-% of the solvents used in the inventive electroless gold plating bath are water for its ecological benign character.

In one embodiment of the invention, the inventive electroless gold plating bath consists of an aqueous solution containing
a) gold ions;
b) sulfite ions;
c) iodide ions;
d) at least one phosphonate compound according to formula (1);
e) optionally, at least one hydroxycarboxylic acid;
f) optionally, a polyalkylene glycol; and
g) optionally, one or more acids, preferably a mineral acid such as phosphoric acid or sulfuric acid; bases such as sodium hydroxide or potassium hydroxide; and/or buffers, e.g. hydrogen phosphate/dihydrogen phosphate, to adjust the pH value of the inventive electroless gold plating bath to above-described values.

The components are preferably used in the concentrations described hereinbefore.

The present invention further concerns a kit-of-parts suitable for providing the inventive electroless gold plating bath, comprising
I) an aqueous solution comprising
sulfite ions;
iodide ions;
at least one phosphonate compound according to formula (1)

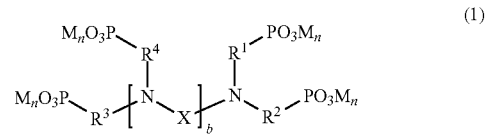

wherein
each X is independently an alkanediyl group;
$R^1$, $R^2$, $R^3$ and each $R^4$ are independently alkanediyl groups;
M is independently hydrogen, a metal atom or a cation forming radical;
each n is a rational number and selected in accordance with the valency of the respective M; and b is an integer ranging from 1 to 10;
optionally, at least one hydroxycarboxylic acid;
optionally, a polyalkylene glycol; and
II) an aqueous solution of gold ions.

This kit-of-parts can easily be combined to form the inventive electroless gold plating bath. Thus, by combing parts I) and II) of the kit-of-parts, and optionally, further dilution with a solvent such as water, the inventive electroless gold plating bath can be provided. This kit-of-parts allows for improved storage and easier transportation as concentrations of the listed components can be much higher than in the inventive electroless gold plating bath. Thus, smaller volumes can be handled which then, can be diluted with a suitable solvent such as water prior to any plating process.

In step (i) of the inventive method, the substrate with the surface is provided. The surface of the substrate to be used in the present invention is preferably a metal or metal alloy surface. Gold is then deposited onto said metal or metal alloy surface in step (ii). Preferable metal or metal alloys are selected from the group consisting of nickel, nickel alloys such as nickel phosphorous alloys, nickel boron alloys, cobalt, cobalt alloys such as cobalt phosphorous alloys, cobalt molybdenum phosphorous alloys, cobalt molybdenum boron alloys, cobalt molybdenum boron phosphorous alloys, cobalt tungsten phosphorous alloys, cobalt tungsten boron alloys, cobalt tungsten boron phosphorous alloys, palladium, palladium alloys such as palladium phosphorous alloys, palladium boron alloys, copper and copper alloys and gold or gold alloys. More preferable metal or metal alloys are selected from the group consisting of nickel phosphorus alloys, palladium and palladium phosphorus alloys. It was found by the inventors that surfaces comprising nickel phosphorus alloys wherein the phosphorus content ranges from 10 to 15 wt.-% with the balance being (essentially) nickel (HiP—Ni surfaces) are particularly suitable for the inventive electroless gold plating bath and the advantages described in this specification are particularly pronounced if such a surface is employed in the inventive method. The inventive electroless gold plating bath is particularly suitable for high end electronic devices due to the extreme good corrosion resistance obtained from said inventive electroless gold plating bath, particularly on HiP—Ni surfaces.

In one embodiment of the invention, the substrate is selected from the group consisting of printed circuit boards, IC substrates, circuit carriers, interconnect devices, semiconducting wafers and glass substrates. The substrate then comprises a surface suitable for plating, preferably selected from above groups.

Optionally, the surface of the substrate is pretreated prior to step (ii). Such pretreatment is known in the art. Typical pretreatments include one or more of cleaning steps (employing solvents and/or surfactants to remove mostly organic contaminants), etching steps (using acids and optionally, oxidizing or reducing agents to remove oxides) and activation steps. The latter is to deposit a noble metal catalyst on the surface or a part thereof to make it more receptive for plating. Such noble metal catalyst is for example palladium which is either deposited as a salt before it is reduced to elementary palladium on the surface of the substrate or it is deposited in a colloidal form and—where appropriate—subjected to an acceleration step with an acid such as hydrochloric acid to remove any protective colloids such as tin colloids. Such treatments give activation layers which normally are not a discrete layers but an aggregation of island structures of palladium. However, activation layers are considered to be metal substrates in the context of the present invention.

In step (ii) of the inventive method, at least a portion of the surface of the substrate is contacted with the inventive electroless gold plating bath. Thereby, a gold layer is deposited onto at least a portion of the surface of the substrate. This contact is preferably accomplished by dipping or immersing the substrate (entirely or partially) into the inventive electroless gold plating bath or by spraying the inventive electroless gold plating bath onto the surface of the substrate.

The temperature of the inventive electroless gold plating bath is preferably in the range of 40 to 85° C., more preferably from 50 to 75° C., even more preferably from 60 to 70° C. during step (ii). The duration of step (ii) is preferably in the range of 3 to 40 min, more preferably 5 to 30 min and most preferably 10 to 20 min. However, if thinner or thicker deposits are desired, the duration of step (ii) can be outside above-described ranges and adjusted accordingly.

It is preferable to replenish components in the inventive electroless gold plating bath which are being consumed during plating. The replenishment can be done continuously, in certain time intervals or whenever necessary. Such components are inter alia the gold ions and the sulfite ions.

In one embodiment of the invention, the inventive electroless gold plating bath is used with horizontal, vertical or spray plating equipment.

It is an advantage of the present invention that the stability of the inventive electroless gold plating bath is high compared to prior art plating baths. Stability herein is to be understood as the lifetime of the bath prior to precipitation of compounds from the bath ("plate-out") rendering it useless for plating purposes. Further advantageously, the inventive electroless gold plating bath is very little adversely affected by the presence of contaminants such as copper ions and/or nickel ions (see Example 2). The inventive gold plating bath form homogeneous gold deposits with little gold layer thickness deviation. The coefficient of variance (standard deviation) of the gold layer thickness is below 10% or even below 7%. This little deviation is advantageously achievable even when forming gold deposits on various surface having different sizes at the same time.

The inventive electroless gold plating bath is useful for depositing gold on a surface of a substrate.

Thus, in one embodiment of the invention, the inventive electroless gold plating bath is used to deposit a gold layer on a surface of a substrate. The surfaces whereon gold is preferably deposited are those described above.

The present invention further concerns a gold layer deposited by the inventive method. Additionally, the present invention is directed to a substrate comprising a gold layer deposited by the inventive method. Preferable gold layer thicknesses to be used in the industry range from 20 to 80 nm, more preferably from 30 to 70 nm, even more preferably from 40 to 60 nm.

INDUSTRIAL APPLICABILITY

The present invention is particularly useful in the electronic industry. Applications of the inventive electroless gold plating bath include the manufacturing of printed circuit boards and IC substrates. Of particular interest are the formed gold layers as wire bondable and solderable surfaces to form interconnections in electronic devices.

EXAMPLES

The invention will now be illustrated by reference to the following non-limiting examples.

Commercial products were used as described in the technical datasheet available on the date of filing of this specification unless stated otherwise hereinafter. Cleaner Pro Select SF, etch cleaner MicroEtch C (Vertical), Aurotech Pre Dip, Aurotech Activator 1000 and Aurotech HP were products obtained from Atotech Deutschland GmbH. Test panels were copper-clad double-sided printed circuit boards in all plating experiments described herein.

The deposit thickness was measured at 10 copper pads on each side of the test panels. The chosen copper pads had different sizes and are used to determine the layer thickness by XRF using the XRF instrument Fischerscope X-RAY XDV-μ (Helmut Fischer GmbH, Germany). By assuming a layered structure of the deposit the layer thickness can be calculated from such XRF data. The plating rate was calculated by dividing the obtained layer thickness by the time necessary to obtain said layer thickness.

Example 1

Inventive

An electroless gold plating bath containing the following components was prepared by dissolution of the following components in water. Firstly, a suitable vessel was charged with deionized water (DI water). Then, the components were added in the sequence given below:

| | |
|---|---|
| 1. EDTMP (provided as free acid) | 40 mmol/L |
| 2. tartaric acid | 200 mmol/L |
| 3. sulfite ions (provided as sodium sulfite) | 50 mmol/L |
| 4. iodide ions (provided as potassium iodide) | 7.5 mmol/L |
| 5. gold ions (provided as sodium gold sulfite) | 5 mmol/l |

Prior to the addition of the gold ions, the pH value was adjusted to approximately pH 5. As a final step prior to any plating processes, the pH value of the electroless gold plating bath was adjusted with sulfuric acid and sodium hydroxide to 7.0.

The above mentioned test panels were subjected to the following process steps (Table 1) by dipping the substrates into the respective solutions employing the given parameters:

TABLE 1

Process sequence for gold plating.

| # | Process step | Product | T [° C.] | t [min] |
|---|---|---|---|---|
| 1 | Cleaner | Pro Select SF | 40 | 5 |
| 2 | Rinse | DI water | 20 | 1 |
| 3 | Etch Cleaner | MicroEtch C (Vertical) | 35 | 2 |
| 4 | Rinse | DI water | 20 | 1 |
| 5 | PreDip | Aurotech Pre Dip | 20 | 3 |
| 6 | Activation | Aurotech Activator 1000 | 20 | 1 |
| 7 | Rinse | DI water | 20 | 1 |
| 8 | Electroless Ni | Aurotech HP | 83 | 40 |
| 9 | Rinse | DI water | 20 | 2 |
| 10 | Electroless gold plating | the electroless gold plating bath as described above | 68 | 10 |

TABLE 1-continued

Process sequence for gold plating.

| # | Process step | Product | T [° C.] | t [min] |
|---|---|---|---|---|
| 11 | Rinse | DI water | 20 | 2 |
| 12 | Hot Rinse | DI water (<2 μS/cm) | 50 | 2 |
| 13 | Drying | — | 60 | 15 |

After this process sequence the thicknesses of the individual metal layers were measured. Gold thicknesses of more than 40 nm were obtained at a coefficient of variance (COV) up to 7%, respectively. The plating rate thus was approximately 240 nm/h and, thus, exceeded today's industry requirements. The gold layers formed on the substrate were lemon yellow and adhered well to the underlying substrate.

Further, the thus obtained substrates were submitted to solderability tests according to IPC J-STD-003C WAM1 (published in 2014):

Edge dip test: All test boards at as received condition, 2× reflow at IPC condition (according to above named standard), and after 8 h aging at 72° C. and 85% relative humidity passed the test.

Wetting balance test: All test boards at as received condition passed the set A criteria. All test boards at 2× reflow at IPC condition, and after 8 h aging at 72° C. and 85% relative humidity passed the set B criteria Wire bonding tests according to DVS 2811 (published in 2017) were passed at as received condition and after 3 h ageing at 120° C. No corrosion events could be found in the micro cross sectional investigations by means of FESEM (field emission secondary electron microscope).

Plating tests in a gold plating tank (made of PVDF) showed these good results even at 10 MTO whereby the ageing were reached by continuous plating of copper clads on FR4 materials.

Example 2

Artificial Longevity Tests of Electroless Gold Plating Baths

Electroless gold plating baths containing the components as given in the subsequent table were prepared by dissolving the named components in water (using the order of the previous example wherever possible). The pH of the plating baths were set to 7.0 with sulfuric acid and sodium hydroxide. In a first run, the electroless gold plating baths were used to plate gold on test panels. The results are summarized in the following table.

In a second run, the electroless gold plating baths were additionally contaminated with 5 mg/L Cu (provided as copper(II) sulfate pentahydrate) and 1.5 g/L Ni (provided as nickel(II) sulfate hexahydrate). These concentrations were typically found in electroless gold plating baths after 10 MTOs when plating on test panels such as those described in Example 1 (having a NiP-surface on copper lines). The electroless gold plating baths were again used for plating on test panels. Plating tests were performed as explained in example 1.

TABLE 2

| Component | I inv. | II inv. | III comp. | IV comp. | V comp. | VI inv. | VII comp. | VIII comp. | IX comp. | X inv. |
|---|---|---|---|---|---|---|---|---|---|---|
| | | | | | [mmol/L] | | | | | |
| gold ions | 5 | 5 | 5 | 5 | 5 | 5 | 5 | 5 | 5 | 5 |
| sulfite ions | 50 | 20 | 50 | 50 | 50 | 50 | 50 | 50 | 50 | 50 |
| iodide ions | 7.5 | 7.5 | — | — | — | 7.5 | 7.5 | 7.5 | 7.5 | 7.5 |
| chloride ions | — | — | — | 7.5 | — | — | — | — | — | — |
| glycine | — | — | — | — | 30 | — | — | — | — | — |
| tartaric acid | 200 | 200 | 200 | 200 | 200 | — | 200 | 200 | 200 | 200 |
| EDTMP | 40 | 40 | 40 | 40 | 40 | 40 | — | — | — | 40 |
| HEDP[1)] | — | — | — | — | — | — | — | 40 | — | — |
| ATMP | — | — | — | — | — | — | — | — | 40 | — |
| thiosulfate | — | — | — | — | — | — | — | — | — | 50 |
| 1st run: plating test results without Cu/Ni | | | | | | | | | | |
| Au [nm] | 48 | 53 | 16 | 16 | 16 | 50 | 46 | 47 | 48 | 22 |
| COV [%] | 3 | 7 | 7 | 6 | 4 | 4 | 3 | 3 | 3 | 14 |
| 2nd run: plating test results with Cu/Ni contamination[2)] | | | | | | | | | | |
| Au [nm] | 43 | 46 | 15 | 16 | 14 | 44 | 0[3)] | 0 | 3 | 18 |
| COV [%] | 3 | 5 | 5 | 7 | 7 | 3 | — | — | — | 14 |

[1)] 1-hydroxyethane 1,1-diphosphonic acid (etidronic acid),
[2)] corresponds to a plating bath of 10 MTOs,
[3)] complete bath plate out Comparative examples III to V showed plating rates which are not acceptable in the electronic industry. Comparative examples VII and VIII allowed for initially sound plating rates, but once they contained contaminants such as Cu ions and Ni ions, their plating rates dropped completely.

The inventive examples I, II and VI allowed for sufficiently high plating rates before and after addition of the contaminants. The gold layers were of a lemon yellow color and adhered well to the substrates. Inventive example X which additionally contained thiosulfate achieved a considerably lower plating rate both, before and after addition of the contaminants.

Other embodiments of the present invention will be apparent to those skilled in the art from a consideration of this specification or practice of the invention disclosed herein. It is intended that the specification and examples be considered as exemplary only, with the true scope of the invention being defined by the following claims only.

The invention claimed is:

1. An electroless gold plating bath, comprising
a) gold ions;
b) sulfite ions;
c) iodide ions; and
d) at least one phosphonate compound according to formula (1)

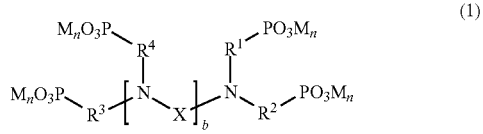

(1)

wherein
each X is an alkanediyl group;
$R^1$, $R^2$, $R^3$ and each $R^4$ are independently alkanediyl groups;
M is independently hydrogen, a metal atom or a cation forming radical;
each n is a rational number and selected in accordance with the valency of the respective M; and
b is an integer ranging from 1 to 10, and
wherein a molar ratio of gold ions to sulfite ions ranges from 1/3 to 1/20.

2. The electroless gold plating bath of claim 1 wherein the pH value of the electroless gold plating bath ranges from 5.5 to 8.5.

3. The electroless gold plating bath of claim 1 wherein the concentration of the sulfite ions ranges from 10 to 150 mmol/L.

4. The electroless gold plating bath of claim 1 wherein the concentration of the iodide ions ranges from 4 to 100 mmol/L.

5. The electroless gold plating bath of claim 1 wherein $R^1$, $R^2$, $R^3$ and each $R^4$ are independently C1-C6-alkanediyl groups.

6. The electroless gold plating bath of claim 1 wherein b ranges from 1 to 6.

7. The electroless gold plating bath of claim 1 wherein the electroless gold plating bath comprises at least one hydroxycarboxylic acid.

8. The electroless gold plating bath of claim 7 wherein the at least one hydroxycarboxylic acid is aliphatic.

9. The electroless gold plating bath of claim 7 wherein the at least one hydroxycarboxylic acid is a C1-C12-hydroxycarboxylic acid.

10. The electroless gold plating bath of claim 1 wherein the electroless gold plating bath is free of thiosulfate ions.

11. The electroless gold plating bath of claim 1 wherein the electroless gold plating bath is free of cyanide ions.

12. The electroless gold plating bath of claim 8 wherein the at least one hydroxycarboxylic acid is a C1-C12-hydroxycarboxylic acid.

13. The electroless gold plating bath of claim 1 wherein molar ratio of gold ions to sulfite ions ranges from 1/4 to 1/16.

14. The electroless gold plating bath of claim 1 wherein the electroless gold plating bath is free of thiosulfate, is free of cyanide ions, and is free of thiourea.

15. The electroless gold plating bath of claim 1 wherein the electroless gold plating bath is free of thiourea.

* * * * *